(12) United States Patent
Goupil et al.

(10) Patent No.: US 8,234,037 B2
(45) Date of Patent: Jul. 31, 2012

(54) METHOD AND DEVICE FOR DETECTING OSCILLATORY FAILURES RELATED TO A SERVOCONTROL SUBSYSTEM OF AN AIRCRAFT CONTROL SURFACE

(75) Inventors: Philippe Goupil, Beaupuy (FR); Jean-Jacques Aubert, Pibrac (FR)

(73) Assignee: Airbus Operations SAS, Toulouse (FR)

( * ) Notice: Subject to any disclaimer, the term of this patent is extended or adjusted under 35 U.S.C. 154(b) by 1055 days.

(21) Appl. No.: 12/123,309

(22) Filed: May 19, 2008

(65) Prior Publication Data

US 2009/0326739 A1  Dec. 31, 2009

(30) Foreign Application Priority Data

May 23, 2007 (FR) ...................... 07 03647

(51) Int. Cl.
 - *G01M 17/00* (2006.01)
 - *G06F 7/00* (2006.01)
 - *G06F 19/00* (2006.01)
 - *G07C 5/00* (2006.01)

(52) U.S. Cl. ............... 701/33.9; 701/3; 701/14; 701/27; 701/29.1; 701/29.2; 702/183; 702/189; 702/191; 702/193; 702/127; 702/144; 702/184; 702/185; 340/945; 340/963; 244/99.11; 244/99.13

(58) Field of Classification Search .................. 701/1, 3, 701/14, 27; 340/945, 963; 702/127, 144, 702/182–185

See application file for complete search history.

(56) References Cited

U.S. PATENT DOCUMENTS

| 5,319,296 A * | 6/1994 | Patel .............................. 318/611 |
| 5,598,991 A * | 2/1997 | Nadkarni et al. ............. 244/203 |
| 2009/0048689 A1 * | 2/2009 | Pelton et al. .................... 700/33 |

FOREIGN PATENT DOCUMENTS

| EP | 0 296 647 | 12/1988 |
| EP | 296647 A * | 12/1988 |

OTHER PUBLICATIONS

Preliminary Search Report dated Dec. 4, 2007 w/ English translation.

* cited by examiner

*Primary Examiner* — Thomas Tarcza
*Assistant Examiner* — Adam Tissot
(74) *Attorney, Agent, or Firm* — Dickinson Wright PLLC (57) ABSTRACT

A method and device for detecting oscillatory faults relating to an aircraft airfoil slaving chain. The device includes units that count the number of overshoots of a threshold value by the current value of a quantity related to the positional slaving of an airfoil. Oscillatory fault is detected based on the number of overshoots of the threshold value being greater than the current value by a predetermined number.

10 Claims, 4 Drawing Sheets

METHOD AND DEVICE FOR DETECTING OSCILLATORY FAILURES RELATED TO A SERVOCONTROL SUBSYSTEM OF AN AIRCRAFT CONTROL SURFACE

FIELD OF THE INVENTION

The present invention relates to a method and a device for detecting oscillatory faults relating to at least one chain for slaving the position of an aircraft airfoil, as well as to a system of electric flight controls comprising such a detection device.

The present invention applies to a slaving chain:
which is intended to slave the position of all types of aircraft airfoil, such as ailerons, spoilers or an elevator for example;
which forms part of a system of electric flight controls of the aircraft; and
which comprises:
said airfoil which is movable, and whose position with respect to the aircraft is adjusted by at least one actuator;
said actuator (servocontrol) which adjusts the position of said airfoil, as a function of at least one actuation order received;
at least one sensor which measures the actual position of said airfoil; and
a computer which formulates an order for actuating the airfoil, transmitted to said actuator, on the basis of said measured actual position and of a control order computed by the automatic pilot or on the basis of the action of the pilot on a control stick and of the inertial state of the aircraft.

BACKGROUND OF THE INVENTION

It is known that such a slaving chain comprises electronic components which may, in failed mode, generate a spurious signal which can cause the slaved airfoil to oscillate. A phenomenon of this type is called an "oscillatory fault". A possible cause of the oscillation is the malfunctioning or breaking of a mechanical part of the servocontrol.

It is known moreover that, when an oscillatory fault such as this exhibits a frequency which lies inside the passband of the actuator, it has the effect:
of generating significant loads on the structure of the aircraft, thereby making it necessary to strengthen this structure;
of generating excessive loads in the event that one of the natural modes of vibration of the aircraft is excited (resonance phenomenon, aeroelastic coupling), and this may, in the extreme case, cause damage to the structure of the aircraft;
of accelerating the fatigue of the actuator or actuators used; and
of reducing the comfort of the aircraft's passengers.

The complete coverage of such oscillatory faults would require overly expensive structural strengthening of the aircraft. In practice, the aircraft is designed to absorb oscillatory faults of a certain amplitude, as a function of frequency. So, monitoring must be put in place to guarantee that the vibrations of the aircraft remain within a predetermined amplitude/frequency envelope.

However, the standard solutions for carrying out such monitoring are highly dependent with respect:
to the hardware used;
to the type of piloting law for the aircraft (function of its flexibility or lack thereof);
to the computer's acquisition and generating system; and
to the fault modes of said computer.

Consequently, to a particular family of aircraft there corresponds on each occasion a particular standard solution, which has no guarantee of being applicable to another, existing or future, family of aircraft.

Moreover, the standard monitoring solutions generally exhibit restricted coverage, usually carrying out only detection of the oscillations generated by a particular component of the slaving chain.

SUMMARY OF THE INVENTION

The present invention relates to a method, which is particularly robust and which is applicable to any type of aircraft with electric flight controls, for detecting at least one oscillatory fault relating to at least one chain for slaving the position of at least one airfoil of the aircraft, in particular of a transport airplane.

For this purpose, according to the invention, said method for detecting at least one oscillatory fault relating to at least one chain for slaving the position of at least one airfoil of an aircraft, said slaving chain forming part of a system of electric flight controls of the aircraft, being associated with a set of information sources which generate in real time the current values of parameters related to the aircraft, and comprising:
said airfoil which is movable, and whose position with respect to the aircraft is adjusted by at least one actuator;
said actuator which adjusts the position of said airfoil, as a function of at least one actuation order received;
at least one sensor which measures in real time the current actual position of said airfoil; and
a computer which comprises piloting laws, which receives said actual position measured by the sensor and the current parameter values, generated by said set of information sources, and which deduces therefrom an actuation order which is transmitted to said actuator,
is noteworthy in that the following series of successive steps is carried out in an automatic and repetitive manner:
a) the current value of a quantity related to the positional slaving of said airfoil is determined;
b) a threshold value is computed, dependent on an extremity value and on a predetermined amplitude value which is dependent on the load constraints on the structure of the aircraft;
c) said current value is compared with this threshold value; and
d) a counting of all the overshoots of said threshold value by said current value is carried out, and, as soon as the number resulting from said counting becomes greater than a predetermined number, an oscillatory fault which represents a periodic signal exhibiting a succession of rising and falling edges separated by break points is detected, said extremity value varying successively and alternately between a predetermined maximum value and a predetermined minimum value during each overshoot generating a counting.

Thus, by virtue of the invention, it is feasible to detect any oscillatory fault relating to a chain for slaving the position of an aircraft airfoil, that is to say any oscillatory fault which might appear in a system (specified below) of electric flight controls which comprises said slaving chain. Within the framework of the present invention, it is considered that an oscillatory fault represents a spurious periodic signal which exhibits a succession of rising and falling edges which are separated by break points (or peak points). It is also feasible to detect any oscillatory fault which propagates within the computation of the piloting laws which generate the slaving setpoint, as specified below.

Furthermore, this detection is particularly robust, since it does not cause any false alarm in principle. Moreover, the method in accordance with the invention is applicable to any type of aircraft.

In a particular embodiment, the overshoots corresponding to transient threshold overshoots, which are not due to a fault, are excluded from the count so as to avoid generating false alarms. For this purpose, with the aim of avoiding overly lengthy memory retention of transient threshold overshoots which are not due to a fault and which would end up leading to a false alarm, a counter which is decremented after a given time is provided. This given time depends on the minimum frequency onwards of which it is desired to detect an oscillatory fault and the number of periods that it is necessary to detect for this purpose. This minimum frequency corresponds to the start frequency of a spectral band isolated by a filter used.

Furthermore, in an advantageous manner, before carrying out the counting, said current value is decomposed into a plurality of frequency bands, and at least said threshold value (and possibly, said predetermined number relating to the counting, beyond which a fault is detected) is adapted to each frequency band so as to carry out the comparison.

This makes it possible to eliminate all the spurious signals outside of said frequency bands so as to improve the robustness of the method in accordance with the invention. Thus, the counting is performed in a limited time window, so as not to accumulate transient spurious threshold overshoots and so as not to count the low-frequency oscillations which are detected by other standard methods.

This particular embodiment makes it possible to optimize the detection of an oscillatory fault, by processing the monitored current value solely in one or more time windows in which the threshold value overshoots are representative of an oscillatory fault that is searched for. Moreover, through this decomposition into frequency bands, it is also possible to provide for different fault levels as a function of frequency band. The latter characteristic makes it possible to improve the robustness of the method in accordance with the invention.

The detection method in accordance with the present invention makes it possible to detect all the modes of failure which relate to the slaving chain, that is to say those generated directly by said slaving chain and also those relating to input parameters used by this slaving chain. For this purpose, the method in accordance with the invention uses, as current value of a quantity related to the positional slaving of the airfoil, a value suited to the type of detection that it is desired to carry out. In particular, in an advantageous manner:
  in a first embodiment, this current value of a quantity related to the positional slaving of the airfoil corresponds to a current residual value which is equal to the difference between said measured (by said sensor) current actual position of the airfoil and an estimated position of the latter;
  in a second embodiment, said current value corresponds directly to said measured (by said sensor) current actual position of the airfoil; and
  in a third embodiment, said current value corresponds to the current value of a parameter related to the aircraft, which is generated by a particular information source of said set of information sources and which is an input of the computation of the piloting laws.

The present invention also relates to a device for detecting at least one oscillatory fault relating to at least one chain (of the aforesaid type) for slaving the position of at least one airfoil (aileron, spoiler, elevator, rudder) of an aircraft, in particular of a transport airplane.

According to the invention, the detection device is noteworthy in that it comprises:
  means for determining the current value of a quantity related to the positional slaving of said airfoil;
  means for computing a threshold value dependent on an extremity value and on a predetermined amplitude value;
  means for comparing said current value with this threshold value; and
  means for carrying out a counting of all the overshoots of said threshold value by said current value, and for detecting, as soon as the number resulting from said counting becomes greater than a predetermined number, an oscillatory fault which represents a periodic signal exhibiting a succession of rising and falling edges separated by break points, said extremity value varying successively and alternately between a predetermined maximum value and a predetermined minimum value during each overshoot generating a counting.

The present invention also relates to a system of electric flight controls of an aircraft, of the type comprising:
  a set of information sources which generate in real time information intended for a chain for slaving the position of an airfoil and which comprise, for example, a control stick and sensors capable of measuring various parameters of the aircraft, such as the angle of incidence for example; and
  at least one chain for slaving the position of this airfoil, of aforesaid type.

According to the invention, this system of electric flight controls is noteworthy in that it comprises, moreover, at least one device for detecting oscillatory faults such as previously described.

BRIEF DESCRIPTION OF THE DRAWINGS

The figures of the appended drawing will elucidate the manner in which the invention may be carried out. In these figures, identical references designate similar elements.

DETAILED DESCRIPTION OF THE INVENTION

Figure 1:
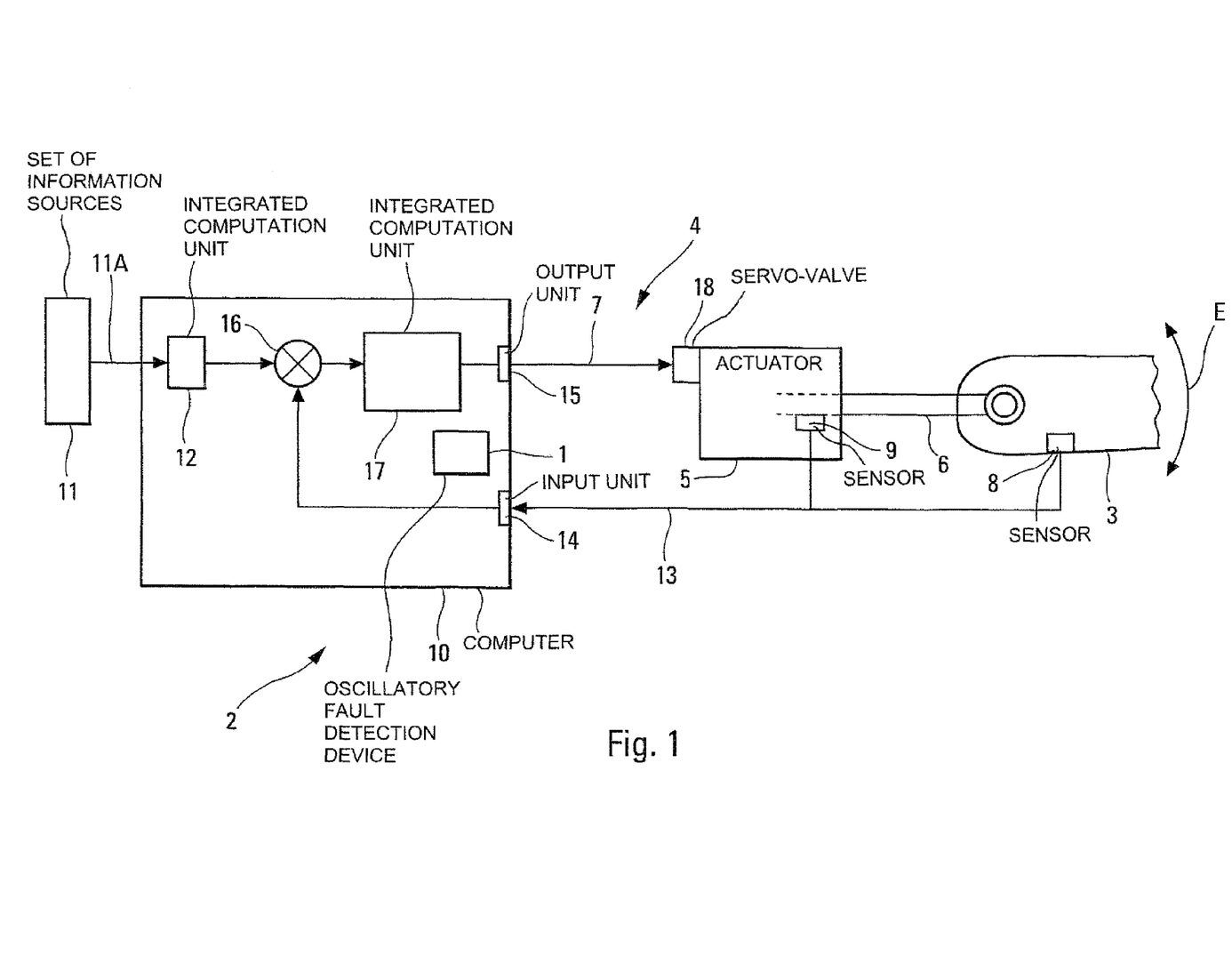
FIG. 1 schematically illustrates a chain for slaving the position of an aircraft airfoil, which comprises a detection device in accordance with the invention.
Figure 2:
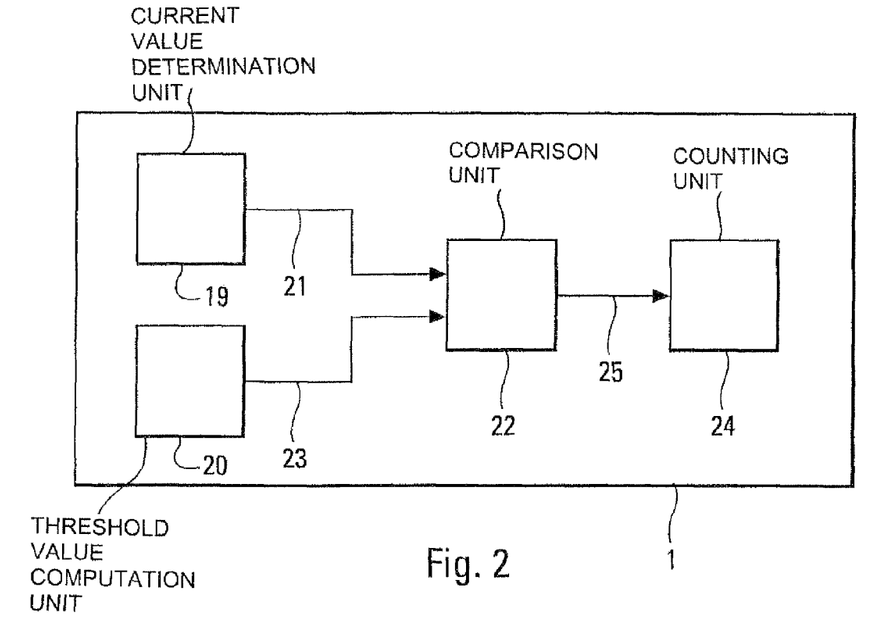
FIG. 2 is the schematic diagram of a detection device in accordance with the invention.

The device 1 in accordance with the invention and schematically represented in FIG. 2 is intended to detect at least one oscillatory fault relating to at least one positional slaving chain 2 (represented in FIG. 1) for at least one airfoil 3

(aileron, spoiler, elevator, rudder) of an aircraft, in particular of a transport airplane, not represented.

In a standard manner, this slaving chain 2 forms part of a system of electric flight controls 4 of the aircraft and comprises:

- said airfoil 3 which is movable, it being capable of being deflected as illustrated by a double arrow E in FIG. 1, and whose position with respect to the structure of the aircraft is adjusted by at least one standard actuator 5;
- said actuator 5 (servocontrol) which adjusts the position of said airfoil 3, for example by way of a rod 6 which acts on the latter, as a function of at least one actuation order received by way of a link 7;
- at least one sensor 8, 9 which measures the current actual position of said airfoil 3. For this purpose, this may be a sensor 8 which is associated directly with the airfoil 3 and/or be a sensor 9 which measures, for example, the displacement of the rod 6 of the actuator 5; and
- a computer 10, for example a flight controls computer:
  - which receives information from a set 11 of information sources, by way of a link 11A. This set 11 comprises standard means for generating control information. It can comprise, in particular, a control stick which is capable of being actuated by a pilot of the aircraft and inertial sensors;
  - which formulates in a standard manner an airfoil control order, with the aid of an integrated computation means 12 which contains piloting laws and which uses for this formulation control information (action of the pilot on the control stick, parameters which indicate the position of the aircraft about its center of gravity, load factors that it experiences, etc.) received from said set 11;
  - which receives the actual position measured by the sensor or sensors 8 and 9, by way of a link 13, via an input 14 which carries out inter alia an analog/digital conversion;
  - which computes on the basis of the previous information (control information and measured actual position) said actuation order, with the aid of an integrated computation means 17 taking account of a predetermined gain; and
  - which transmits this actuation order to a servovalve 18 of the actuator 5, by way of the link 7 via an output 15 which carries out inter alia a digital/analog conversion.

All the elements of this slaving chain 2 which contain electronic components, and in particular the sensors 8, 9, the input 14, the output 15, etc., are sources of oscillatory faults, that is to say of faults which might generate a spurious electrical signal which can cause the airfoil 3 to oscillate. The same holds for certain information sources of the set 11. It will be noted that a possible cause of an oscillation is the malfunctioning or breaking of a mechanical part of the servocontrol.

Said system of electric flight controls 4 comprises, in addition to said slaving chain 2, said set 11 (which can form part of the device 1) and said device 1 which is intended to detect any oscillatory fault of the aforesaid type.

For this purpose, said detection device 1 in accordance with the invention comprises, as represented in FIG. 2:

- means 19 specified below, for determining (or acquiring) the current value SG of a quantity (also specified hereinafter) which is related to the positional slaving of the airfoil 3;
- means 20 which are formed so as to compute a threshold value specified below, which depends on an extremity value X and a (predetermined) peak to peak minimum amplitude value S;
- means 22 which are connected by way of links 21 and 23 respectively to said means 19 and 20 and which are formed so as to compare the current value SG received from said means 19 with the threshold value received from said means 20; and
- means 24 which are connected by way of a link 25 to said means 22 and which are formed so as to carry out a counting of all the overshoots of said threshold value by said current value SG, and for detecting, as soon as the number resulting from said counting becomes greater than a predetermined number, for example than 4, an oscillatory fault.

For this purpose, said extremity value X varies, successively and alternately, between a predetermined maximum value Xmax and a predetermined minimum value Xmin, during each overshoot generating a counting, as specified below.

Thus, the device 1 in accordance with the invention is able to detect any oscillatory fault relating to a chain 2 for slaving the position of an aircraft airfoil 3, that is to say any oscillatory fault which might appear in a system (specified above) of electric flight controls 4 which comprises said slaving chain 2. Within the framework of the present invention, it is considered that an oscillatory fault represents a spurious periodic signal which exhibits a succession of rising and falling edges which are separated by break points (or peak points).

Furthermore, the detection implemented by the device 1 is particularly robust, since in principle it does not cause any false alarm. Moreover, said device 1 is applicable to any type of aircraft.

Figure 3:
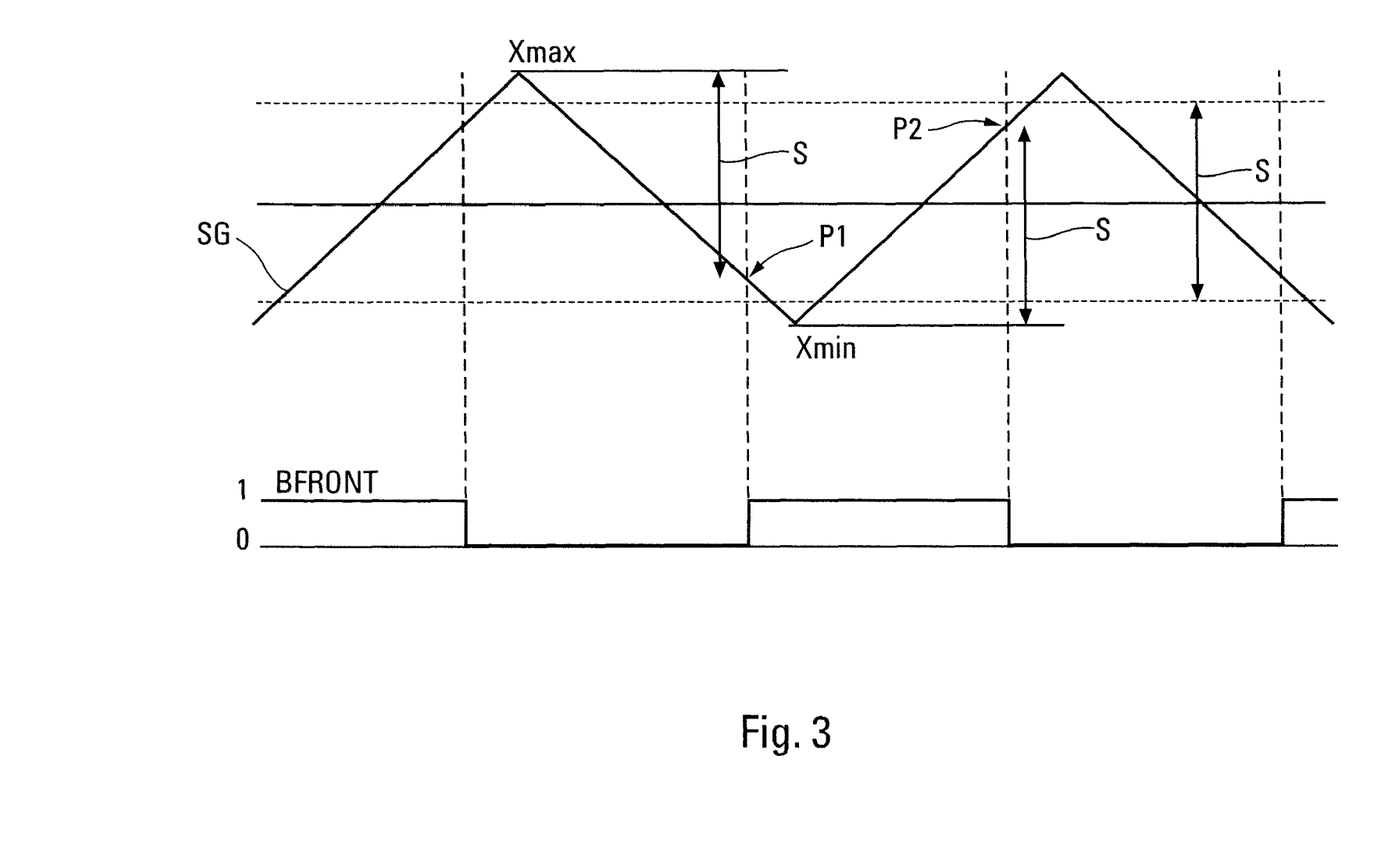
FIG. 3 is a chart making it possible to depict the particular counting implemented by a detection device in accordance with the invention.

FIG. 3 shows in its upper part the signal SG which pertains to a quantity related to the positional slaving of the airfoil 3, whose current value is determined in real time, and on the basis of which the device 1 carries out monitoring so as to be able to detect an oscillatory fault. More precisely, the device 1 seeks to detect the oscillations of minimum amplitude S peak to peak. For this purpose, it takes into account an extremity value X which represents a reference value on the basis of which a threshold overshoot X+S or X−S is sought. X will take successively the maximum value Xmax and the minimum value Xmin. FIG. 3 depicts in particular overshoots which are taken into account during the counting, at particular points P1 and P2. Each counting is depicted by a change of slope or change of edge BFRONT represented in the lower part of FIG. 3 and specified further below.

Figure 4:
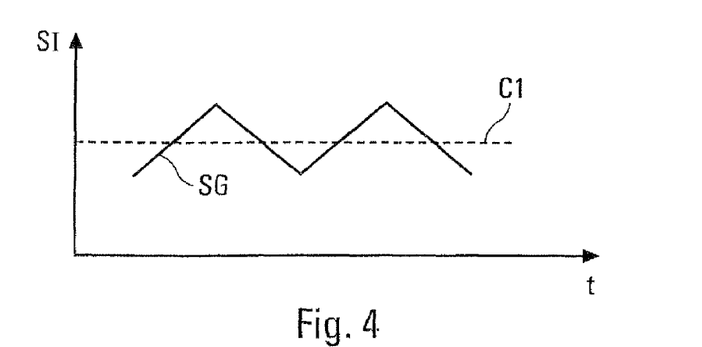
FIGS. 4 and 5 are charts making it possible to show that a detection of oscillatory faults in accordance with the invention is independent of the continuous component of the temporal signal monitored.
Figure 5:
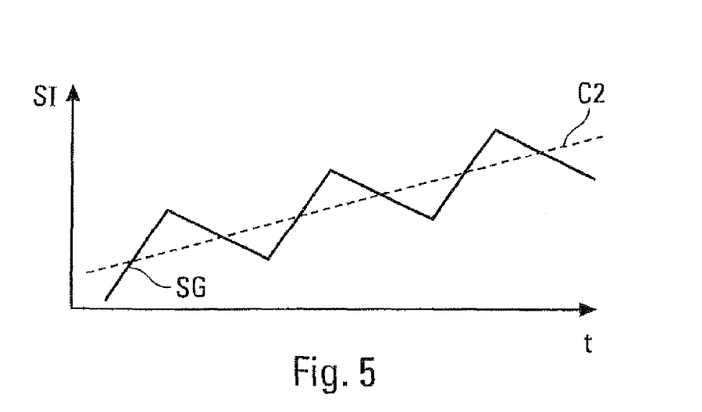

As represented in FIGS. 4 and 5, the device 1 in accordance with the invention makes it possible to detect oscillations, doing so whatever the continuous component of the monitored temporal signal, for example the position of the airfoil 3 in a particular example. Specifically, these FIGS. 4 and 5 show the variation of a signal SI as a function of time t, by depicting said analyzed signal SG which:

- in the example of FIG. 4, is defined with respect to a constant component C1; and
- in the example of FIG. 5, is defined with respect to a variable component C2, in this instance linearly increasing.

Consequently, the detection device 1 in accordance with the invention is able to carry out the detection of oscillatory faults even if the oscillation is carried by a continuous component (FIG. 4) or if it is carried by another signal (FIG. 5), low frequency for example, since it undertakes detection of the extreme values. For the implementation of the present invention, it is therefore not necessary to undertake a filtering to determine the continuous components. However, if one does not wish to detect the oscillations at overly high frequencies, it is possible to provide for filtering means in the device 1 so as to filter the monitored signal by a low-pass filter. It is also possible to act on a counter specified below, while precluding any detection in an overly short time, which is synonymous with the presence of a high frequency.

The device 1 in accordance with the invention makes it possible to detect all the modes of failure which relate to the slaving chain 2, that is to say those generated directly by said slaving chain 2 and equally those relating to input parameters used by this slaving chain 2. For this purpose, the device 1 in accordance with the invention takes into account with the aid of the means 19, as quantity related to the positional slaving of the airfoil 3, a quantity which is suited to the type of detection that it is desired to carry out. In particular:

- in a first embodiment, this quantity related to the positional slaving of the airfoil 3 corresponds to a current residual value which is equal to the difference between said measured (by said sensor 8, 9) current actual position of the airfoil 3 and an estimated position of the latter, which is estimated in a standard manner. In this case, the device 1 comprises means (not represented) for computing this residual value and means (also not represented) for computing this estimated position;
- in a second embodiment, said quantity corresponds directly to said current actual position of the airfoil 3, which is measured by said sensor 8, 9; and
- in a third embodiment, said quantity corresponds to a parameter related to the aircraft, for example the angle of incidence of the aircraft, whose current value is generated by a particular information source of said set 11 of information sources.

Said means 19 can correspond directly to the means (sensor 8, 9, set 11, etc.) which generate the previous values or only be connected to these means so as simply to acquire said values.

It is known that, generally several sensors 8, 9 or several information sources (forming part of the set 11 of information sources), for example three incidence probes for measuring an angle of incidence, are present on an aircraft for determining the current value of a particular quantity. So, when the device 1 in accordance with the invention detects an oscillatory fault in one of these sensors or one of these sources, the value generated by this sensor or this source is no longer taken account of aboard the aircraft, and in particular in the aforesaid piloting laws.

The device 1 in accordance with the invention therefore comprises means which make it possible to detect one or more oscillatory faults in a temporal signal. The detection device 1 can be used to improve the control capability and the safety of the aircraft. Moreover, said device 1 also exhibits the following advantages:

- it is simple to implement from an algorithmic point of view;
- it exhibits limited computational cost, which makes it possible to install it in real time, and avoids overloading the flight controls computers;
- it avoids resorting to a frequency analysis, which would be much more complex; and
- it does not require any specific sensor or gauge and therefore has no negative impact on the weight budget.

The device 1 therefore makes it possible to detect and to passivate very rapidly (in a few cycles, whatever the frequency) oscillatory faults, which can have potentially harmful consequences for the structure of the aircraft, in particular when they occur inside the passband of the actuator 5 of the airfoil 3.

Figure 6:
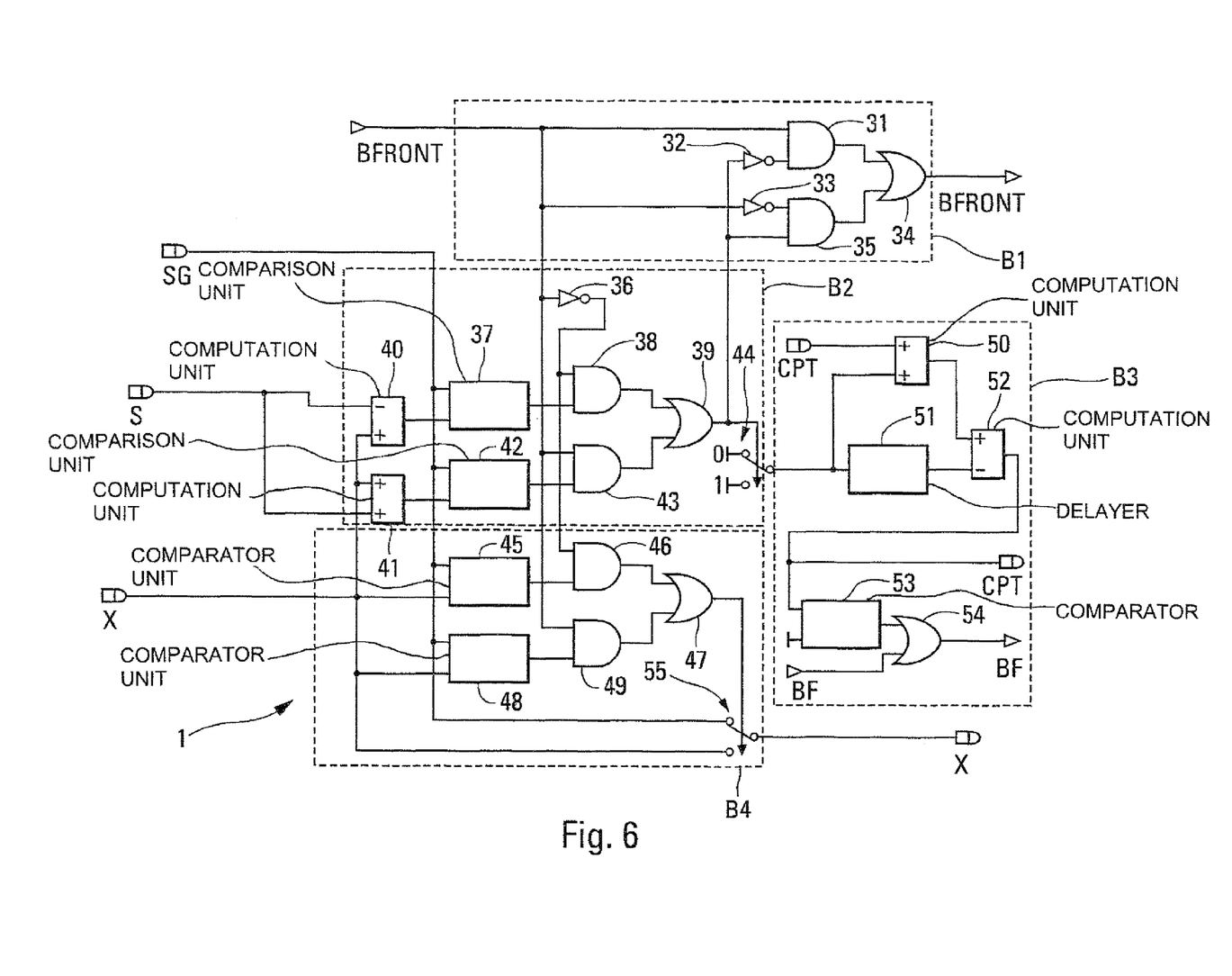
FIG. 6 is the schematic diagram of logic used for the counting implemented by a detection device in accordance with the invention.

FIG. 6 is a diagram illustrating an exemplary embodiment of logic used in the counting implemented within the framework of the present invention. In this FIG. 6:

- the inputs SG, CPT, X and S are numerical quantities with SG the monitored signal, CPT the counter of oscillations, X the extremity value (which corresponds to Xmax or to Xmin) and S the amplitude value (used to compute the threshold value); and
- the triangular symbols BFRONT and BF are Booleans, with BFRONT a change-of-edge (rising or falling) indicator and BF a fault detection indicator.

When a variable is both output and input, such as the variable X for example, this signifies that the input at an instant k is equal to the output at the previous instant k-1 (loopback).

The logic represented in FIG. 6 can be decomposed into four blocks B1, B2, B3 and B4 which are intended for the following operations:

- B1: detection of a change of slope (or of edge);
- B2: detection of a threshold crossing;
- B3: counting; and
- B4: determination of the extremity values.

The block B1 comprises inverters 32 and 33, logic AND gates 31 and 35, and a logic OR gate 34, as represented in FIG. 6.

BFRONT remains locked in one state (for example 1) so long as the signal SG is rising edge-like, and returns to the zero state as soon as an overshoot of the threshold value Xmin+S is detected. Conversely, BFRONT remains locked at zero for a falling edge, and it toggles to 1 when an overshoot of the threshold value Xmax−S is detected (FIG. 3). It is the detection of a threshold crossing (output of the logic OR gate 39) which drives the toggling of BFRONT.

As regards the block B2, it comprises:
- an inverter 36;
- logic AND gates 38 and 43;
- a logic OR gate 39;
- comparison means 37 and 42;
- computation means 40 and 41 which compute respectively the difference and the sum of the parameters input; and
- a switching means 44.

If the signal SG is on a rising edge, the extremity value is Xmin. The first input of the logic AND gate 43 is at 1, while the first input of the logic AND gate 38 is at zero (it being possible to regard the output of the inverter 36 as akin to the falling edge condition). The logic AND gate 38 therefore remains at zero during the rising edge. On the other hand, as soon as the signal takes a value greater than the threshold value Xmin+S (output of the comparator 42=1), the output of the logic AND gate 43 goes to 1, and a threshold crossing is detected. Through the inverter 32 going to zero, the Boolean BFRONT reverts to zero, and falling edge condition is toggled to. The extremity value then becomes Xmax. The output of the logic AND gate 43 toggles to zero, and so long as the signal remains greater than the new threshold value Xmax−S, the output of the logic AND gate 38 remains equal to zero, thereby making it possible to count just a single overshoot at the threshold crossing. The value 1 output by the switching means 44 is dispatched to the counter represented by the block B3. The same reasoning as previously described can be applied, by analogy, in the falling edge configuration, to detect a crossing of the threshold value Xmax−S.

Furthermore, said block B3 comprises:
computation means 50 and 52 which compute respectively the sum and the difference of the parameters input;
a delayer 51;
a comparator 53; and
a logic OR gate 54.

At each threshold overshoot, the switching means 44 delivers the value 1 once. As each previously computed value is reinjected at the input of the computation means 50, the counter CPT is incremented.

It will be noted that the delayer 51 stores a value for a time T, before dispatching it to the computation means 52, to decrement the counter. This makes it possible to count the oscillations starting only from a frequency fmin and to avoid reckoning the transient overshoots that are not due to a fault which would end up leading to a false alarm after a certain time. In this case, we have T=nT/fmin with nT the number of confirmation periods.

Finally, the comparator 53 verifies whether the value of the counter is greater than the desired number of confirmation half-periods. If this is the case, the Boolean that it produces goes to the true state, thereby indicating the presence of a fault. The logic OR gate 54 makes it possible to latch the fault, that is to say to lock the variable BF at the true value so as to retain a trace of the detection.

Additionally, the block B4 which is intended to determine the extremity values (Xmin, Xmax) comprises:
comparators 45 and 48;
logic AND gates 46 and 49;
a logic OR gate 47; and
a switching means 55.

Assuming that we start from X=Xmin, so long as a rising edge remains, if the signal is greater than Xmin, the extremity value remains pegged at Xmin (the logic AND gate 49 is at 1 since both its inputs are at 1). On the other hand, as soon as the threshold is crossed (signal above Xmin+S), the rising edge condition goes to zero, and the output of the logic AND gate 49 falls to zero, as well as the output of the logic OR gate 47. The reference therefore now becomes the signal itself. At the moment the signal crosses the maximum Xmax, the comparator 45 goes to 1, and therefore also the comparator 46, and finally the extremity value X becomes Xmax. This remains true up to the next threshold overshoot Xmax−S, where a rising edge is attacked again.

Additionally, it will be noted that within the framework of the present invention, it is also possible to decompose the monitored signal SG into several sub-bands, by virtue of a digital filtering (integrated within the device 1). This makes it possible to adjust the detections differently in each frequency band. It is possible, for example, to undertake the detection of oscillations beyond 1° (deflection of the airfoil 3) in three periods in a first frequency band, and beyond 2° in five periods in a second frequency band. Furthermore, this also makes it possible to render the detection more robust. Specifically, as indicated previously, to avoid retaining transient threshold overshoots, which are not due to a fault and which would end up leading to a false alarm, in memory for too long, the counter is decremented after a time T dependent on the minimum frequency fmin, from which it is desired to carry out a detection, and on the number of periods nT that it is necessary to detect with T=nT/fmin.

The frequency fmin corresponds to the start frequency of the spectral band isolated by the filter. This amounts to counting in a time window of defined duration. By working in several frequency sub-bands, it is possible to adapt the size of this time window to the frequency of each start of band. The higher the frequencies to which one rises, the more reduced is the size of the time window and the more rapidly the transients will be eliminated, thereby helping to enhance the robustness of the counting procedure used by the device 1.

The invention claimed is:

1. A method for detecting at least one oscillatory fault relating to at least one slaving chain for slaving the position of at least one airfoil of an aircraft, said slaving chain forming part of a system of electric flight controls of the aircraft, being associated with a set of information sources which generate in real time the current values of parameters related to the aircraft, said method comprising:
providing a movable airfoil, whose position with respect to the aircraft is adjusted by at least one actuator;
adjusting the position of said airfoil by the actuator, as a function of at least one actuation order received by the actuator;
measuring by at least one sensor, in real time, a current actual position of said airfoil; and
receiving by a computer, which comprises piloting laws, said actual position measured by the at least one sensor and the current parameter values, generated by said set of information sources, with the computer computing and transmitting the at least one actuation order to said actuator,
wherein the computer further carries out the steps of:
a) determining a current value of a quantity related to the position of said airfoil;
b) determining a threshold value;
c) comparing said current value relating to the position of the airfoil with the determined threshold value to determine an overshoot of the threshold value by the current value; and
d) counting the number of overshoots of said threshold value by said current value to detect an oscillatory fault, wherein the oscillatory fault, is represented by a periodic signal exhibiting a succession of rising and falling edges separated by break points:
wherein
in step b),
an extremity value is determined, which varies successively and alternately between a maximum value Xmax and a minimum value Xmin during each overshoot generating a counting; and
the threshold value is determined from said extremity value and a predetermined amplitude value S, with the threshold value being equal to Xmax−S when the extremity value corresponds to Xmax and to Xmin+S when the extremity value corresponds to Xmin; and
in step d),
an oscillatory fault is detected based on the counted number of overshoots of the threshold value being greater than a predetermined number.

2. The method as claimed in claim 1, wherein the overshoots which correspond to transient threshold overshoots are excluded from the count.

3. The method as claimed in claim 1, wherein before carrying out the counting, said current value is decomposed into a plurality of frequency bands, and at least said threshold value is adapted to each frequency band so as to carry out the comparison.

4. The method as claimed in claim 1, wherein said quantity related to the positional slaving of the airfoil corresponds to a residual value which is equal to the difference between said measured actual position of the airfoil and an estimated position of this airfoil.

5. The method as claimed in claim 1,
wherein said quantity related to the positional slaving of the airfoil is equal to said measured actual position of the airfoil.

6. The method as claimed in claim 1,
wherein said quantity related to the positional slaving of the airfoil corresponds to a parameter related to the aircraft, whose current value is generated by said set of information sources.

7. A device that detects at least one oscillatory fault relating at least to a slaving chain for slaving position of at least one airfoil of an aircraft, said slaving chain forming part of a system of electric flight controls of the aircraft, being associated with a set of information sources which generate in real time current values of parameters related to the aircraft, wherein said slaving chain comprises:
  a movable airfoil, whose position with respect to the aircraft is adjusted by at least one actuator as a function of at least one actuation order received by the actuator;
  at least one sensor which measures in real time the actual position of said airfoil; and
  a computer which comprises piloting laws, which receives said actual position measured by the sensor and the current parameter values generated by said set of information sources, and which computes and transmits an actuation order to said actuator,
wherein said device comprises:
  current positional value determining unit that determines the current value of a quantity related to the position of said airfoil;
  threshold value computation unit that computes a threshold value;
  comparison unit that compares said current value related to the position of the airfoil with the computed threshold value to determine an overshoot of the threshold value by the current value; and
  counting unit that counts number of the overshoots of said threshold value by said current value determined by the comparison unit to detect an oscillatory fault, wherein the oscillatory fault is represented by a periodic signal exhibiting a succession of rising and falling edges separated by break points,
wherein:
  the threshold value computation unit determines an extremity value which varies successively and alternately between a maximum value Xmax and a minimum value Xmin during each overshoot generating a counting, and computes the threshold value on the basis of said extremity value and of a predetermined amplitude value S, the threshold value being equal to Xmax−S when the extremity value corresponds to Xmax and to Xmin+S when the extremity value corresponds to Xmin; and
  said counting unit detects the oscillatory fault based on the counted number of overshoots of the threshold value being greater than a predetermined number.

8. A system of electric flight controls of an aircraft, said system-comprising:
  a set of information sources which generate in real time the current values of parameters related to the aircraft and
  at least one slaving chain, which comprises
    a movable airfoil, whose position with respect to the aircraft is adjusted by at least one actuator, wherein said actuator is configured to adjust position of said airfoil as a function of at least one actuation order received by the actuator;
    at least one sensor which measures in real time an actual position of said airfoil; and
    a computer which comprises piloting laws which receives said actual position measured by the sensor and the current parameter values, generated by said set of information sources, and which deduces therefrom an actuation order which is transmitted to said actuator,
  which further comprises at least one device as set forth in claim 7.

9. An aircraft,
which comprises the system of claim 8.

10. The device of claim 7, wherein each unit of the device is configured relative to one another to implement logic functions based on
  numerical inputs of SG, CPT, X and S, wherein:
  SG represents a monitored position signal,
  CPT represents a counter of oscillations,
  X represents the extremity value corresponding toto Xmax or Xmin, and
  S represents amplitude value used to compute the threshold value; and
  Boolean determinations BFRONT and BF, with BFRONT being based on a change-of-edge indicator and BF being based on a fault detection indicator.

* * * * *